(12) United States Patent
Dicke

(10) Patent No.: US 8,626,184 B2
(45) Date of Patent: Jan. 7, 2014

(54) METHOD AND APPARATUS FOR REDUCING TRANSMISSION OF LOCATION INFORMATION

(75) Inventor: Ronald Anthony Dicke, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 438 days.

(21) Appl. No.: 12/432,226

(22) Filed: Apr. 29, 2009

(65) Prior Publication Data
US 2010/0279706 A1 Nov. 4, 2010

(51) Int. Cl.
*H04W 24/00* (2009.01)

(52) U.S. Cl.
USPC .................. 455/456.1; 455/456.2; 455/456.3; 455/456.5

(58) Field of Classification Search
USPC ....................... 455/456.1, 456.2, 456.3, 456.5
See application file for complete search history.

(56) References Cited

U.S. PATENT DOCUMENTS

| | | | |
|---|---|---|---|
| 6,311,069 B1 | 10/2001 | Havinis et al. | |
| 6,438,370 B1 | 8/2002 | Einola et al. | |
| 6,587,782 B1 | 7/2003 | Nocek et al. | |
| 6,885,874 B2 | 4/2005 | Grube et al. | |
| 7,164,986 B2 | 1/2007 | Humphries et al. | |
| 7,224,987 B1 | 5/2007 | Bhela et al. | |
| 7,305,365 B1 | 12/2007 | Bhela et al. | |
| 7,339,469 B2 | 3/2008 | Braun | |
| 7,395,075 B2 | 7/2008 | Posner et al. | |
| 8,019,532 B2 * | 9/2011 | Sheha et al. | 701/420 |
| 2002/0145561 A1 | 10/2002 | Sandhu et al. | |
| 2006/0187028 A1 | 8/2006 | Kiang et al. | |
| 2006/0270421 A1 | 11/2006 | Phillips et al. | |
| 2007/0015520 A1 | 1/2007 | Casey | |
| 2007/0018811 A1 | 1/2007 | Gollu | |
| 2007/0244633 A1 | 10/2007 | Phillips et al. | |
| 2008/0070593 A1 | 3/2008 | Altman et al. | |
| 2008/0186165 A1 | 8/2008 | Bertagna et al. | |
| 2009/0043501 A1 * | 2/2009 | Lohi et al. | 701/213 |
| 2009/0102668 A1 * | 4/2009 | Thompson et al. | 340/573.3 |
| 2012/0077475 A1 * | 3/2012 | Holcomb et al. | 455/414.1 |

FOREIGN PATENT DOCUMENTS

| | | |
|---|---|---|
| EP | 1 473 959 A1 | 11/2004 |
| EP | 1 480 011 A1 | 11/2004 |
| EP | 1528714 | 5/2005 |
| EP | 1 840 514 A1 | 10/2007 |

(Continued)

OTHER PUBLICATIONS

Office Action from U.S. Appl. No. 12/432,412 dated Jul. 11, 2011.

(Continued)

*Primary Examiner* — Barry Taylor
(74) *Attorney, Agent, or Firm* — Gowling Lafleur Henderson LLP

(57) ABSTRACT

Provided is a method and apparatus for reducing transmission of location information when tracking the geographic location of one or more mobile devices. A mobile device generates location information using GPS technology and provides the location information to a communication device on an ongoing basis. In a first embodiment, if the location information of the mobile device is not needed, then the communication device transmits a message indicating that the location information of the mobile device is not needed. Upon receiving the message, the mobile device stops providing location information to the communication device on the ongoing basis. This can reduce the amount of information that gets transferred over the air between users sharing their location information.

16 Claims, 10 Drawing Sheets

(56) References Cited

FOREIGN PATENT DOCUMENTS

| EP | 1850606 | 10/2007 |
|---|---|---|
| WO | 02/21478 A2 | 3/2002 |
| WO | 03/034765 A1 | 4/2003 |
| WO | WO 03/053077 | 6/2003 |
| WO | 2006/118373 A1 | 11/2006 |
| WO | 2007/002303 A1 | 1/2007 |

OTHER PUBLICATIONS

Office Action from U.S. Appl. No. 12/432,428 dated Jun. 21, 2011.
"Google Maps Reverse Geocoder", Daft Logic—Logic, but in a different way, http://www.daftlogic.com/sandbox-google-maps-reverse-geocoder.htm, 4 pages in total, Apr. 28, 2009.
"Click for Country", Daft Logic—Logic, but in a different way, http://www.daftlogic.com/sandbox-click-for-country.htm, 4 pages in total.
Greenwell H., "OMA and Location Based Services", OMA Mobile Alliance, London, Sep. 3-4, 2008, 26 pages in total.
"Loopt Location-Sharing Joins Google Android Market", Loopt Location-Sharing Joins Google Android Market—GPS LBS, http://lbs.gpsworld.com/gpslbs/LBS+News/Loopt-Location-Sharing-Joins-Google-Android-Market/ArticleStandard/Article/detail/571971?contextCategoryId=38444&searchString=loopt, 3 pages in total, Apr. 28, 2009.
"WhosHere", http://myrete.com/WhosHere.html, WhosHere overview—myRete—Mobile Proximity Networking—Now Wherever you Are!, 3 pages in total, Apr. 28, 2009.
"Global Locator for Geocoding" Trillium Software, http://www.trilliumsoftware.com/home/products/globallocator/index.aspx, 1 page, Apr. 28, 2009.
"Mobile Codes Requirements", OMA Open Mobile Alliance OMA-RD-MC-V1_0_0-20081206-D, Draft Version 1.0.0—Dec. 6, 2008.
Ku et al., "Location-based Spatial Queries with Data Sharing in Mobile Environments", University of Southern California, http://citeseerx.ist.psu.edu/viewdoc/summary?doi=10.1.99.43, 22 pages in total, Jul. 6, 2005.
Marshall et al., "SiliconBeat: A blog tool to fence in your children", http://www.siliconbeat.com/entries/2005/02/08/a_blog_tool_to_fence_in_your_children.html, 2 pages in total.

"Wavemarket", Wavemarket, Inc., http://www.wavemarket.com/products_page.php?products=1, 2 pages in total, Feb. 1, 2009.
"About Sprint Family Locator", Sprint Family Locator: Compatible Mobile Phones, http://sfl.sprintpcs.com/finder-sprint-family/moreInfo.htm, 2 pages in total, Feb. 1, 2009.
"Blackberry Tracker: Free Live GPS Tracking & Anti-Theft with Geofence Alerts & GPS History for Blackberry", http://thinkabdul.com/2008/02/02/blackberry-tracker-free-live-gps-tracking-anti-theft-with-geofence-alerts-gps-history-for-blackberry/, 4 pages in total.
"MoosTrax GPS Tracking for Mobile Devices", http://moostrax.com/feature/geofence/, 2 pages in total, Feb. 1, 2009.
"trackr! GPS tracking", http://www.trackr.eu/, 1 page, Feb. 1, 2009.
"Blackberry Enterprise Server on Domino Discussion: GPS Reporting to BES Server in 4.1 SP3 IT Policy", http://besdomino.blogspot.com/2007/05/gps-reporting-to-bes-server-in-41-sp3.html, 3 pages in total.
Witteman, Ing M.T., "Efficient proximity detection among mobile clients using the GSM network", Alcatel-Lucent, http://dacs.ewi.utwente.nl/assignments/completed/master/reports/2007-witteman.pdf, 83 pages in total.
"Facebook Friends GPS: Track & locate Facebook Friends using Mobile GPS Co-ordinates", http://74.125.95.132/search?q=cache:YMQySX6locQAJ:thinkabdul.com/2007/11/04/facebook-friends-gps-track-locate-facebook-friends-using-mobile-gps-co-ordinates/+update+location+on +facebook+using+gps&hi=en&strip=1, 3 pages in total.
"Google Latitude", Google Mobile: Latitude for your phone, http://www.google.com/mobile/default/latitude.html, 2 pages in total, Mar. 25, 2009.
European Search Report that issued on Mar. 16, 2010 from corresponding European Patent Application No. 09159125.5, 2 pages.
European Search Report that issued on Mar. 8, 2010 from related European Patent Application No. 09159123.0, 2 pages.
European Search Report that issued on Apr. 1, 2010 from related European Patent Application No. 09159121.4, 2 pages.
Search and Exam Report dated Sep. 30, 2009 from related European Patent Application No. 09159118.0.

* cited by examiner

# METHOD AND APPARATUS FOR REDUCING TRANSMISSION OF LOCATION INFORMATION

FIELD OF THE DISCLOSURE

The application relates to mobile devices, and more particularly to tracking the geographic location of one or more mobile devices.

BACKGROUND

A location-based service (LBS) is an information and entertainment service that makes use of the geographical position of one or more mobile devices. Some applications involves tracking the geographic location of one or more mobile devices. In order for a communication device to track the location of a mobile device, the communication device receives location information from which the geographical location of the mobile device can be determined. The location information can be generated by the mobile device using GPS technology or by other means. The communication device can receive location information on an ongoing basis in order to keep up to date on the geographical location of the mobile device.

In order to accurately track the geographical location of the mobile device, location information might be provided rather frequently, for example every few seconds. Unfortunately, this can involve a lot of messaging. Excessive messaging can be costly in terms of network utilization and power consumption for the mobile device. If the communication device performing the tracking is also mobile, then power consumption for the communication device is also a concern.

This problem can be worsened if the communication device is tracking more than one mobile device. Tracking the geographic location of several different mobile devices increases the number of messages involved.

BRIEF DESCRIPTION OF THE DRAWINGS

Embodiments will now be described with reference to the attached drawings in which.

DETAILED DESCRIPTION OF EMBODIMENTS

Figure 1:
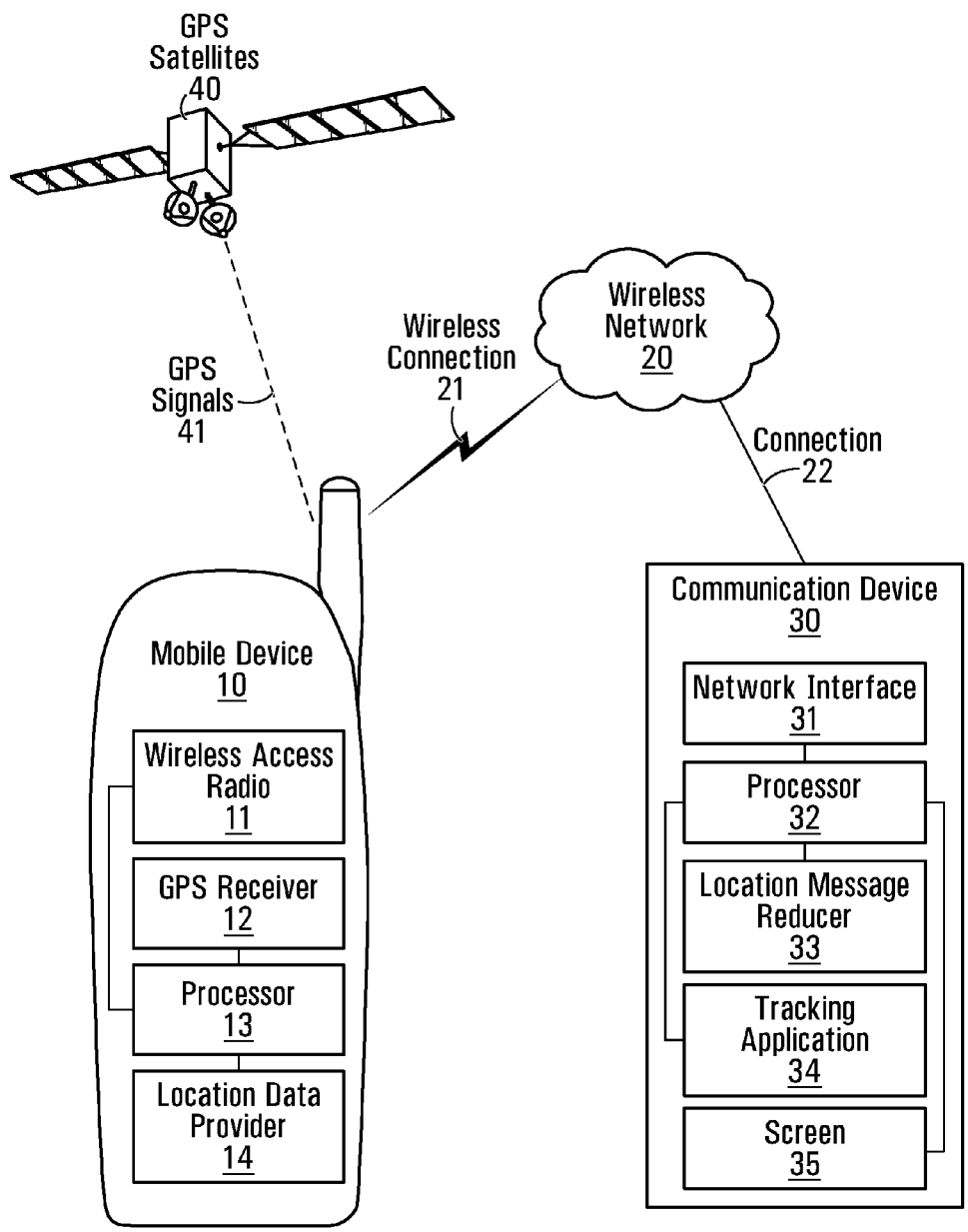
FIG. 1 is a block diagram of an example communication system.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect, there is provided a method for execution in a communication device, the method comprising: automatically receiving location information of a mobile device on an ongoing basis; determining whether location information of the mobile device is needed; and if location information of the mobile device is not needed, transmitting a message indicating that location information of the mobile device is not needed.

According to another broad aspect, there is provided a method for execution in a mobile device, the method comprising: automatically sending location information of the mobile device on an ongoing basis; receiving a message indicating that location information of the mobile device is not needed; and in response to the message, ceasing to send location information of the mobile device on the ongoing basis.

According to another broad aspect, there is provided a method comprising: determining a boundary defining an area of possible locations for a mobile device outside of which an update of location information of the mobile device is needed; and transmitting a message indicating the boundary and that an update of location information of the mobile device is needed upon the mobile device leaving the boundary; wherein determining the boundary comprises determining the boundary based on both location and speed of the mobile device.

According to another broad aspect, there is provided a computer readable medium having computer executable instructions stored thereon for execution on a processor of a communication device or a server so as to implement any of the methods summarised above.

According to another broad aspect, there is provided a communication device comprising: a network interface; a processor; and a location message reducer configured for: automatically receiving location information of a mobile device on an ongoing basis; determining whether location information of the mobile device is needed; and if location information of the mobile device is not needed, transmitting a message indicating that location information of the mobile device is not needed.

According to another broad aspect, there is provided a mobile device comprising: a wireless access radio; a processor; and a location data provider configured for: automatically sending location information of the mobile device on an ongoing basis; receiving a message indicating that location information of the mobile device is not needed; and in response to the message, ceasing to send location information of the mobile device on the ongoing basis.

According to another broad aspect, there is provided an apparatus comprising: a network interface; a processor; and a location message reducer configured for: determining a boundary defining an area of possible locations for a mobile device outside of which an update of location information of the mobile device is needed; and transmitting a message indicating the boundary and that an update of location information of the mobile device is needed upon the mobile device leaving the boundary; wherein determining the boundary comprises determining the boundary based on both location and speed of the mobile device.

Other aspects and features of the present disclosure will become apparent, to those ordinarily skilled in the art, upon review of the following description of the specific embodiments of the invention.

Apparatus for Reducing Location Messages

Turning now to FIG. 1, shown is a block diagram of an example communication system. The communication system has a wireless network 20, and a plurality of devices 10,30 including a mobile device 10 and a communication device 30. There might be other devices, but they are not shown for simplicity. The mobile device 10 has a wireless access radio 11, a GPS receiver 12, a processor 13, a location data provider 14, and might have other components but they are not shown for simplicity. The communication device 30 has a network interface 31, a processor 32, a location message reducer 33, a tracking application 34, a screen 35, and might have other components but they are not shown for simplicity. There are a plurality of GPS satellites 40 (only one shown for simplicity) for those devices that are GPS-enabled, for example the mobile device 10.

The operation of the communication system will now be described by way of example. For this example, it is assumed that the communication device 30 is tracking the geographic location of at least one mobile device including the mobile device 10 shown in the illustrated example. The mobile device 10 generates location information using GPS technology, which involves receiving GPS signals 41 from the GPS satellites 40 using its GPS receiver 12. The location data provider 14 of the mobile device 10 provides location information to the communication device 30 for location tracking. Communication between the communication device 30 and the mobile device 10 is through the wireless network 20. The mobile device 10 uses its wireless access radio for communicating wirelessly over a wireless connection 21, while the communication device 30 uses its network interface 31 for communicating over a connection 22. The network interface 31 can be a wireless access radio if the communication device 30 is a mobile device, or any suitable network interface if the communication device 30 is a wired device.

The tracking application 34 uses the location information of the mobile device 10 for tracking the location of the mobile device 10. The tracking application 34 might for example display on the screen 35 a graphic representation of the location of the mobile device 10 on a map. In order to accurately track the geographical location of the mobile device 10, location information might be sent rather frequently, for example every few seconds. Unfortunately, this can involve a lot of messaging. Excessive messaging can be costly in terms of network utilization and power consumption for the mobile device 10. If the communication device 30 is a mobile device, then its power consumption is also a concern. In accordance with an embodiment of the disclosure, the location message reducer 33 is configured to reduce the number of location information messages involved. This can reduce the amount of information that gets transferred over the air between users sharing their location information.

In a first embodiment, if the location information of the mobile device 10 is not needed, for example if the tracking application 34 is no longer running or is otherwise not presently tracking the location of the mobile device 10, then the location message reducer 33 transmits a message indicating that the location information of the mobile device 10 is not needed. Upon receiving the message, the location data provider 14 of the mobile device 10 stops providing location information to the communication device 30. This can avoid excessive messaging by avoiding location messages that are not needed. The mobile device 10 might also shut down its GPS receiver 12 if it is not needed for any other purpose. The GPS receiver 12 can be turned back on if for example the mobile device 10 later receives notification that another device needs its location. Further details of the first embodiment are provided below with reference to FIG. 2 through FIG. 4.

In a second embodiment, the location message reducer 33 transmits a message indicating a specified distance for the mobile device 10 to travel before location information of the mobile device 10 is needed. In some implementations, the specified distance is determined based on a distance that corresponds to a pixel of the screen 35 at a given resolution. Upon receiving the message, the location data provider 14 of the mobile device 10 sends location information only whenever the mobile device 10 moves the specified distance. This can avoid excessive messaging, especially when the mobile device is not moving much. Further details of the second embodiment are provided below with reference to FIG. 5.

A combination of the first embodiment and the second embodiment is also possible. For instance, in accordance with the second embodiment, the location message reducer 33 can transmit a message indicating a specified distance for the mobile device 10 to travel before location information of the mobile device 10 is needed. Thus, the communication device 30 receives location information of the mobile device 10 only whenever the mobile device 10 moves the specified distance. If at a later time the location information of the mobile device 10 is no longer needed, then in accordance with the first embodiment the location message reducer 33 transmits a message indicating that the location information of the mobile device 10 is not needed. Thus, the communication device 30 no longer receives location information of the mobile device 10.

In the illustrated example, the location message reducer 33 is implemented as software and is executed on the processor 32. However, more generally, the location message reducer 33 may be implemented as software, hardware, firmware, or any appropriate combination thereof. Although shown as a single component, more generally, the location message reducer 33 may have one or more components. The one or more components may be integrated with other components. Also, functionality of the location message reducer 33 might be combined with other components. For example, in alternative implementations, the location message reducer 33 and the tracking application 34 are combined as a single component. Other implementations are possible.

In some implementations, the location data provider 14 of the mobile device 10 stores rules of location sharing, including proximity detection, geofencing and simple location sharing to determine if the mobile device 10 even has to send its location information and how often it should be sent. This can reduce the amount of information that gets transferred over the air between users sharing their location information. Example details of location sharing for proximity detection and geofencing are provided below with reference to FIG. 6 and FIG. 7.

In the illustrated example, the location data provider 14 is implemented as software and is executed on the processor 13. However, more generally, the location data provider 14 may be implemented as software, hardware, firmware, or any appropriate combination thereof.

In the illustrated example, it is assumed that the communication device 30 and the mobile device 10 communicate in a peer-to-peer fashion. However, it is to be understood that alternative arrangements are possible and are within the scope of the disclosure. In alternative implementations, the communication device 30 and the mobile device 10 communicate via a server (not shown).

For server-based implementations, the mobile device 10 provides location information to the server, which in turn provides the location information to the communication device 30. If the communication device 30 sends a message for reducing the number of location messages, then the message is processed by the server. For example, if the communication device 30 sends a message indicating that the location information of the mobile device 10 is not needed, then the server can forward the message along to the mobile device 10 so that the mobile device 10 stops providing location information, assuming of course that the server does not need the location information for other purposes (e.g. for providing location information to another tracking device). If the server needs the location information for other purposes, then the server does not forward the message along to the mobile device 10 and instead continues to receive location information from the mobile device 10 but does not forward the location information to the communication device 30. Thus, the communication device 30 does not receive location information when it is not needed, as similarly described for the peer-to-peer implementation. Further details of server-based implementation are provided below with reference to FIG. 8 and FIG. 9.

In the illustrated example, it is assumed that at least some of the plurality of devices 10,30 are GPS-enabled for determining geographic location. Whilst examples presented herein focus on use of GPS, it is to be understood that alternative means for determining geographic location are possible and are within the scope of this disclosure. For example, geographic location can alternatively be determined based on cell/sector identification within cellular network. As another example, geographic location can be determined using triangulation of signals from in-range base towers, such as those used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location information can be obtained not only be triangulating the device's position based on nearby cell towers but also based on nearby Wi-Fi access points via a WLAN radio. As an alternative example, geographic location can be determined based on bar codes. Each bar code is located in a predefined location and encodes location information for that location. A mobile device, upon scanning/taking picture of one of these bar codes, can obtain the location information. The bar codes can be 1-dimensional, or 2-dimensional. Other means for determining geographic location may be possible.

In the examples presented herein, reference is made to "location information" of a mobile device. It is to be understood that there are many possibilities for the location information. In specific implementations, the location information is presence information. In some implementations, the location information includes coordinates of the location of the mobile device. The coordinates might for example be derived using GPS technology. More generally, the location information includes any suitable information from which the location of the mobile device can be determined.

The communication device 30 has been described to have a configuration for location tracking, whilst the mobile device 10 has been described to have a configuration for providing location information. In some implementations, the communication device 30 is mobile and is also configured to provide location information in a similar manner as the mobile device 10. Likewise, in some implementations, the mobile device 10 is configured to perform location tracking in a similar manner as the communication device 30. In some implementations, both the communication device 30 and the mobile device 10 are configured for location tracking and for providing location information. In specific implementations, the mobile device 10 and the communication device 30 have identical configurations. Other implementations are possible.

First Method for Reducing Location Messages

Figure 2:
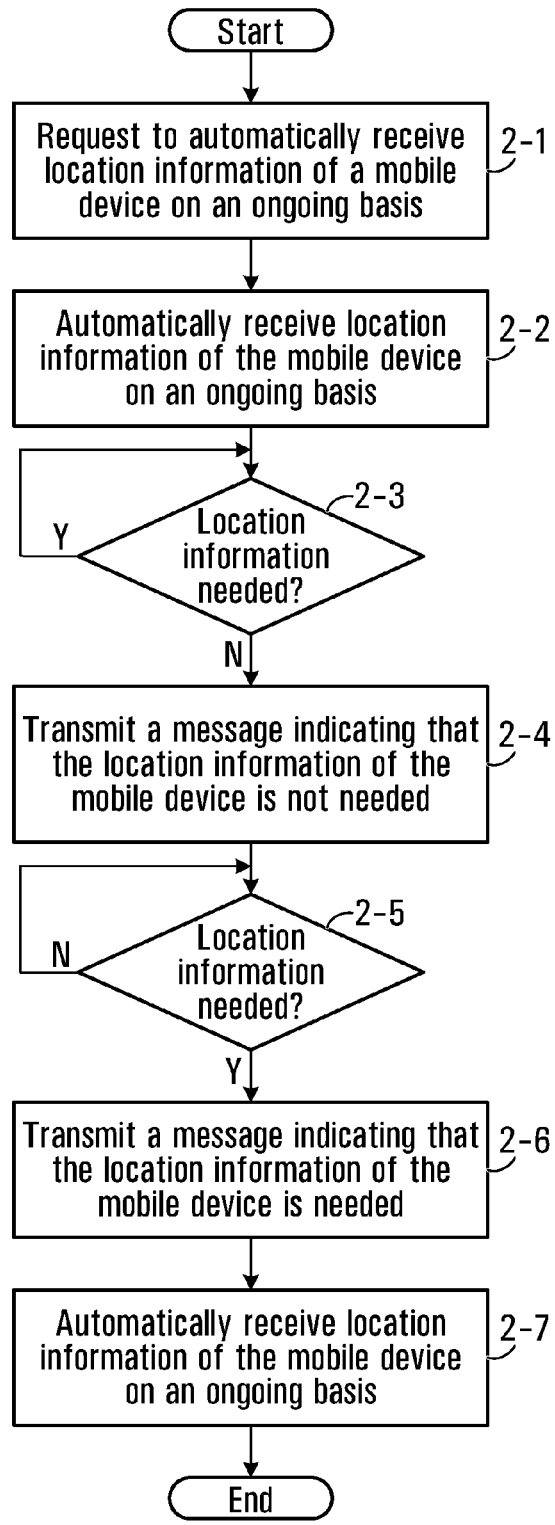
FIG. 2 is a flowchart of a first method of reducing transmission of location information for location tracking.

Referring now to FIG. 2, shown is a flowchart of a first method of reducing transmission of location information for location tracking. This method may be implemented in a communication device, for example by the location message reducer 33 of the communication device 30 shown in FIG. 1. Alternatively, this method may be implemented in any appropriately configured communication device that tracks the location of a mobile device. The communication device might be wireless or wired. For this example it is assumed that the communication device and the mobile device communicate in a peer-to-peer fashion. However, it is to be understood that they can alternatively communicate via a server as described earlier.

In some implementations, as indicated at step 2-1, the communication device requests to automatically receive location information of the mobile device on an ongoing basis. Upon receiving the request, the mobile device starts to provide location information on an ongoing basis. Therefore, at step 2-2, the communication device automatically receives location information of the mobile device on an ongoing basis. The location information might for example be used by an application tracking the geographic location of the mobile device. In order to accurately track the geographical location of the mobile device, location information might be provided rather frequently, for example every few seconds. Unfortunately, this can involve a lot of messaging.

At step 2-3, the communication device determines whether location information of the mobile device is needed. This might for example involve determining whether the location information is presently needed. In specific implementations, this involves determining whether an application that uses the location information is no longer running or is otherwise not presently tracking the location of the mobile device. Alternatively, or additionally, a determination might be made as to whether the location information is expected to be needed at some future time. In accordance with an embodiment of the disclosure, if the location information of the mobile device is not needed, then at step 2-4 the communication device transmits a message indicating that the location information of the mobile device is not needed. Upon receiving the message, the mobile device stops providing location information to the communication device on an ongoing basis. This avoids excessive messaging by avoiding location messages that are not needed.

Later at step 2-5 the communication device determines whether location information of the mobile device is needed. This might for example involve determining whether the application that uses the location information has been re-executed or is otherwise not tacking the location of the mobile device. If location information of the mobile device is needed, then at step 2-6 the communication device transmits a message indicating that the location information of the mobile device is needed. Upon receiving the message, the mobile device continues to provide location information on an ongoing basis. At step 2-7, the communication device automatically receives the location information on an ongoing basis. Thus, the application that uses the location information can continue to use the location information for tracking purposes.

In some implementations, the method returns to step 2-3 so that the communication device can determine at a later time whether location information of the mobile device is needed. In other words, the method can repeat itself.

In the examples presented herein, reference is made to a communication device automatically receiving location information of the mobile device on an "ongoing basis". In some implementations, the ongoing basis is periodic. However, it is to be understood that the ongoing basis can be irregular and might be dependent upon one or more events or variables. For example, an update of location information of a mobile device might be received only whenever the mobile device moves a specified distance. Regardless, location information is provided automatically without any specific request except for an initial request for automatically receiving location information on an ongoing basis.

The method described above with reference to FIG. 2 pertains to a communication device performing location tracking. Other methods for a communication device performing location tracking are presented later. It is to be understood that, for each method described for the communication device performing location tracking, there is a corresponding method for the mobile device being tracked. An example is described below with reference to FIG. 3.

Figure 3:
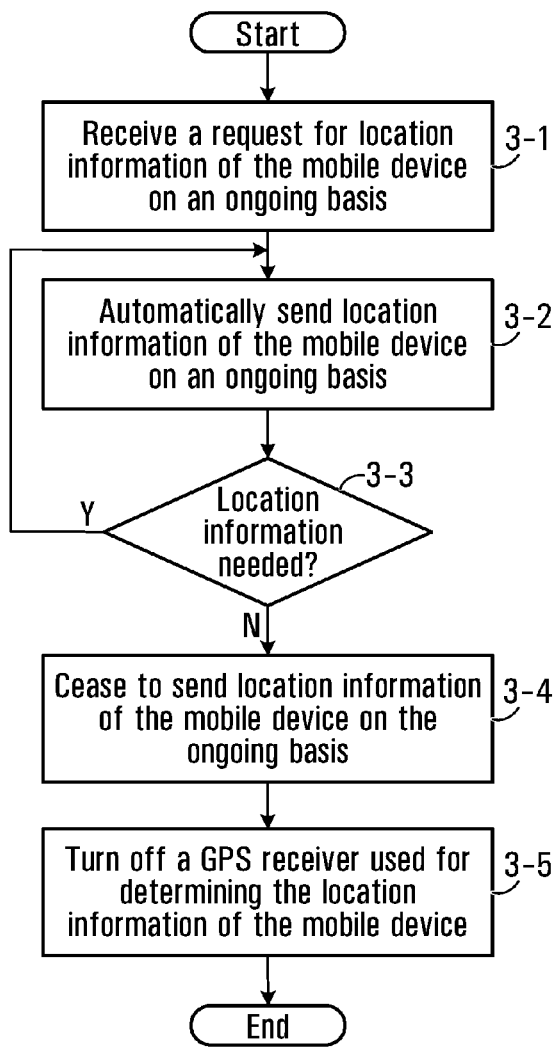
FIG. 3 is a flowchart of a method of ceasing to send location information if it is not needed for location tracking.

Referring now to FIG. 3, shown is a flowchart of a method of ceasing to send location information if it is not needed for location tracking. This method may be implemented in a mobile device, for example by the location data provider 14 of the mobile device 10 shown in FIG. 1. Alternatively, this method may be implemented in any appropriately configured mobile device. For this example it is assumed that the mobile device communicates with a communication device in a peer-to-peer fashion. However, it is to be understood that they can alternatively communicate via a server as described earlier.

In some implementations, as indicated at step 3-1, the mobile device receives a request for location information of the mobile device on an ongoing basis. This might be for example because a tracking application of the communication device is to track the location of the mobile device. At step 3-2, the mobile device automatically sends location information of the mobile device on an ongoing basis. This allows the communication device to track the location of the mobile device. In some implementations, a GPS receiver used for determining the location information of the mobile device is turned on if it is off at the time of the request.

If at step 3-3 the mobile device receives a message indicating that location information of the mobile device is not needed, then at step 3-4 the mobile device ceases to send location information of the mobile device on the ongoing basis. The mobile device might receive the message for example if a tracking application that uses the location information is no longer running or is otherwise not presently tracking the location of the mobile device.

In some implementations, as indicated at step 3-5, the mobile device turns off a GPS receiver used for determining the location information of the mobile device if the GPS receiver is not needed for any other purpose. Turning off the GPS receiver can reduce power consumption for the mobile device. The GPS receiver can be turned back on if for example the mobile device later receives notification that another device needs its location.

In some implementations, the method returns to step 3-1 at a later time if the mobile device receives another request for location information of the mobile device on an ongoing basis. In other words, the method can repeat itself.

Figure 4A:
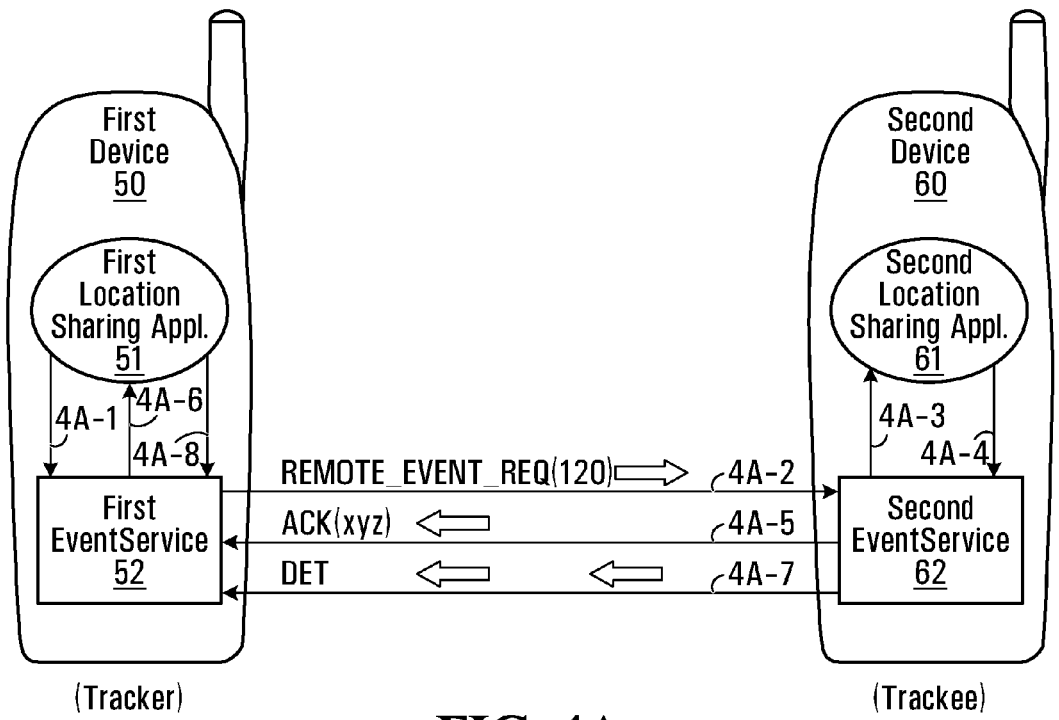
FIGS. 4A and 4B are signaling diagrams showing example signaling that might be used for starting and stopping transmission of location information.
Figure 4B:
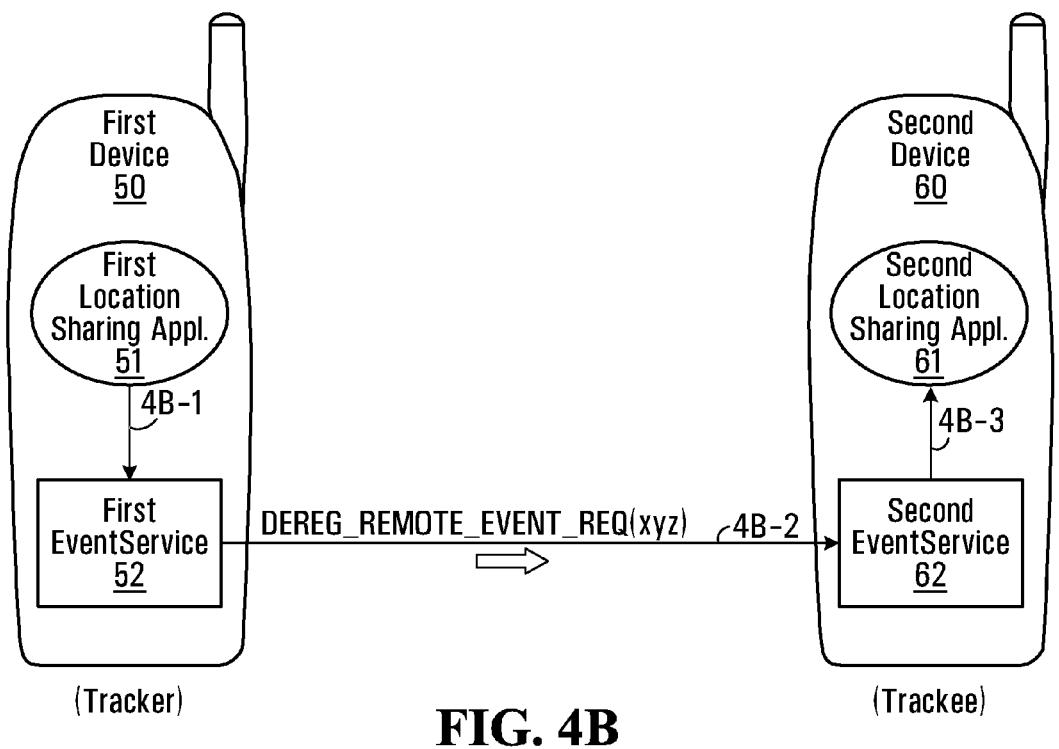

Referring now to FIGS. 4A and 4B, shown are signaling diagrams showing example signaling that might be used for location tracking. The signaling is shown between a first device 50 having a first location sharing application 51 and a first event service 52, and a second device 60 having a second location sharing application 61 and a second event service 62. For this example it is assumed that the first device 50 and the second device 60 communicate in a peer-to-peer fashion. However, it is to be understood that they can alternatively communicate via a server as described earlier. It is also to be understood that these signaling diagrams are very specific for exemplary purposes.

Referring first to FIG. 4A, signaling is shown for a scenario in which the first device 50 wants to be notified about the location of the second device 60 on an ongoing basis. At step 4A-1, the first location sharing application 51 sends to the first event service 52 a location event request. At step 4A-2, the first event service 52 sends to the second event service 62 an event request for receiving location information every 120 seconds. Note that the interval of 120 seconds is implementation specific. The event request is processed by the second event service 62 to determine whether permission has been granted for location information. If permission has not already been granted, then at step 4A-3 the second event service 62 sends to the second location sharing application 61 a request for permission. At step 4A-4, the second location sharing application 61 sends to the second event service 62 a response indicating whether permission has been granted. Note that steps 4A-3 and 4A-4 can be skipped if permission has been previously granted. For this example, it is assumed that permission has been granted, either previously or by the response at step 4A-4. At step 4A-5, the second event service 62 sends to the first event service 52 an acknowledgement indicating whether the event request has been granted. The acknowledgement indicates an identifier (e.g. location event 'xyz') to the first device 50 so that any subsequent request involving the location event can identify the location event using the identifier. At step 4A-6, the first event service 52 sends to the first location sharing application 51 an indication of whether the location event request was granted.

For this example, it is assumed that the location event request has been granted. Therefore, at step 4A-7 the second event service 62 sends location messages to the first event service 52. In this example, this includes location information at periodic intervals of 120 seconds as requested. At step 4A-8, for each message received at step 4A-7, the first event service 52 sends to the first location sharing application 51 a notification about the event. Thus, the first location sharing application 51 receives location information of the second device 60 on a periodic basis.

Referring now to FIG. 4B, signaling is shown for a scenario in which the first device 50 no longer wants to be notified about the location of the second device 60. This scenario might arise for example if the first location sharing application 51 is no longer running or is otherwise not tracking the location of the second mobile device 60 and so there is no need for location information of the second device 60. At step 4B-1, the first location sharing application 51 sends to the first event service 52 a remove location event request. At step 4B-2, the first event service 52 sends to the second event service 62 a remove event request. The remove event request identifies the location event using the identifier previously received (i.e. location event 'xyz') and is processed by the second event service 62 to remove the location event. Once removed, the second event service 62 no longer sends location messages to the first event service 52. Finally, at step 4B-3 the second event service 62 sends to the second location sharing application 61 a notification that the location event has been removed.

In the illustrated example, the location event is removed using a remove event request. In alternative implementations, the location event is merely paused or placed on hold. Note that there is no need to remove the location event. There might be advantages and disadvantages to each approach. For instance, if a location event is merely paused or placed on hold, then state might be maintained in order to keep track of which events are on hold. However, with removing the event request, there is no need to remember the event request. Another consideration is that there might be a fair bit of handshaking for establishing location events between devices. Therefore, if a location event is merely paused or placed on hold, then the overhead involved in re-establishing a location event can be avoided. Rather, a simple resume message can be used to resume the location event after a simple pause/hold message is used to pause or hold the location event.

Second Method for Reducing Location Messages

Figure 5:
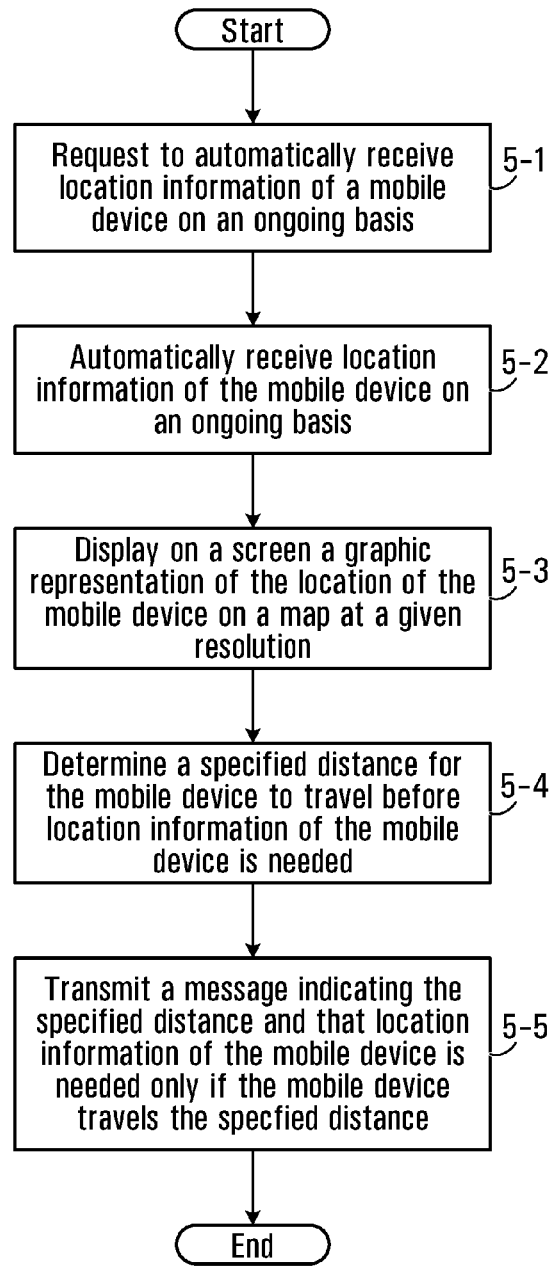
FIG. 5 is a flowchart of a second method of reducing transmission of location information for location tracking.

Referring now to FIG. 5, shown is a flowchart of a second method of reducing transmission of location information for location tracking. This method may be implemented in a communication device, for example by the location message reducer 33 of the communication device 30 shown in FIG. 1. Alternatively, this method may be implemented in any appropriately configured communication device that tracks the location of a mobile device. The communication device might be wireless or wired. For this example it is assumed that the communication device and the mobile device communicate in a peer-to-peer fashion. However, it is to be understood that they can alternatively communicate via a server as described earlier.

At step 5-1, the communication device requests to automatically receive location information of a mobile device on an ongoing basis. Upon receiving the request, the mobile device starts to provide location information on an ongoing basis. At step 5-2, the communication device automatically receives location information of the mobile device on an ongoing basis. The location information might for example be used by an application tracking the geographic location of the mobile device. In some implementations, as indicated at step 5-3, the communication device displays on a screen a graphic representation of the location of the mobile device on a map at a given resolution.

In order to accurately track the geographic location of the mobile device, location information might be received rather frequently, for example every few seconds. Unfortunately, this can involve a lot of messaging. However, depending on the resolution of the map being displayed, small changes in location of the mobile device might have no effect on how the location is displayed on the map. For instance, if a map of the entire world is being displayed, then a single pixel on the screen might correspond to approximately 32 km. Accordingly, there might be no need to receive location information for the mobile device unless it moves 32 km from its current position.

Therefore, at step 5-4 the communication device determines an amount of distance for the mobile device to travel before location information of the mobile device is needed. In some implementations, the communication device determines the smallest distance that the mobile device has to move for any application on the communication device to be interested in being notified. At step 5-5, the communication device transmits a message indicating the specified distance and that location information of the mobile device is needed only if the mobile device travels the specified distance. This might for example inform the mobile device that its location information is not needed unless the mobile device moves 32 km (or other distance based on current resolution) from its current position. Upon receiving the message, the mobile device provides location information to the communication device only whenever there is movement of the specified distance as indicated by the communication device. This avoids excessive messaging by avoiding location messages that are not needed.

Note that the communication device continues to receive location information of the mobile device on an ongoing basis, but that the frequency of updates can be reduced because updates are provided only whenever the mobile device travels the specified distance.

In some implementations, the method returns to step 5-4 if there is any change to the amount of distance for the mobile device to travel before location information of the mobile device is needed. This might occur for example if there is a change to the resolution of a map being displayed. This might also occur if the tracking application used for displaying the location of the mobile device in the map has been closed, or if another tracking application is launched.

In the illustrated example, it is assumed that the communication device determines the specified distance. In alternative implementations, the specified distance is static and preconfigured in the communication device in which case the communication device might not determine the specified distance per se. Note that this would not allow changes to the specified distance based on changes to the resolution of a map being displayed.

A combination of the first method and the second method is also possible. For instance, in accordance with the first method, the communication device can transmit a message indicating a specified distance for the mobile device to travel before location information of the mobile device is needed. Thus, the communication device receives location information of the mobile device only whenever the mobile device moves the specified distance. If at a later time the location information of the mobile device is no longer needed, then in accordance with the first method the communication device transmits a message indicating that the location information of the mobile device is not needed. Thus, the communication device no longer receives location information of the mobile device.

Proximity Detection

Proximity detection involves detecting whether two objects are within vicinity of one another, or conversely out of vicinity of one another. A mobile device can determine whether it is within vicinity of another mobile device by receiving location information of the other mobile device and comparing it to its own location information. Frequently receiving location information of the other mobile device can allow for accurate tracking. However, as explained earlier, excessive messaging is undesirable. Proximity detection implemented in a manner that can reduce the amount of location information involved will now be described with reference to FIG. 6 and FIG. 7.

Figure 6:
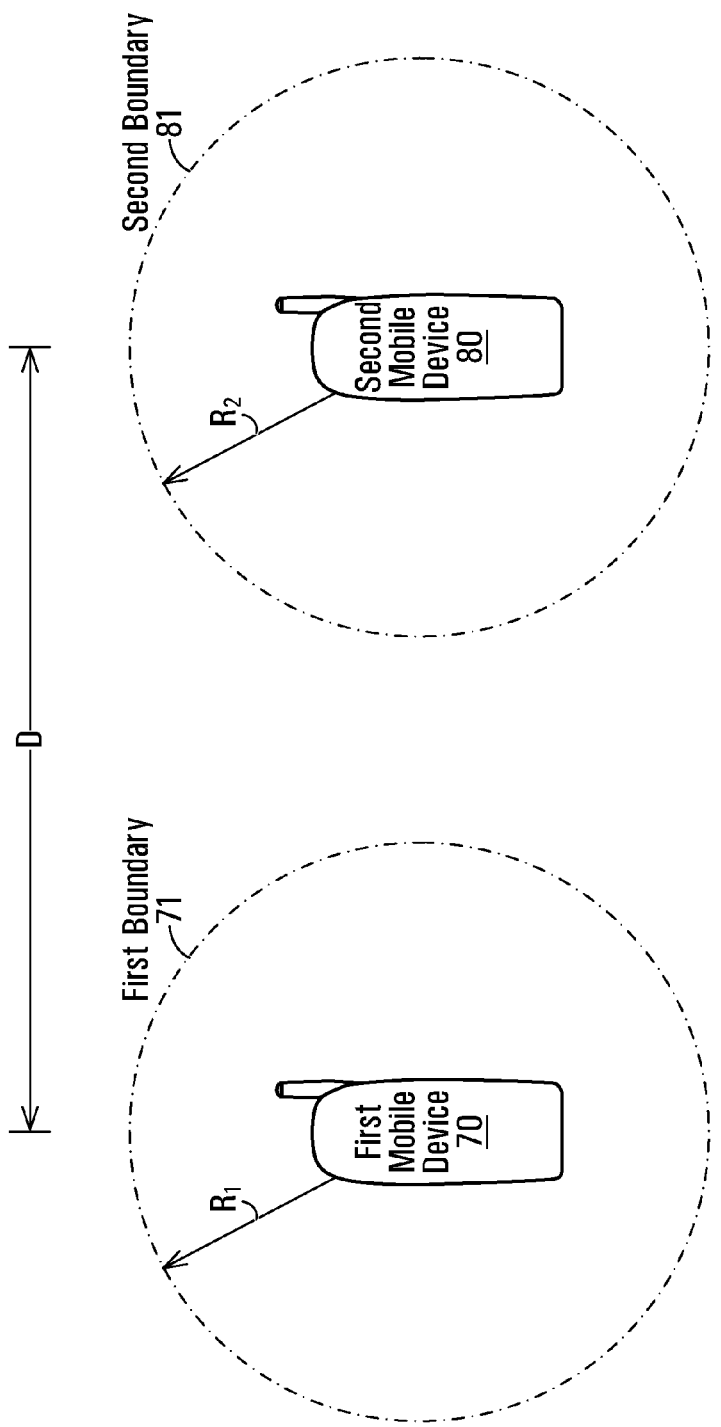
FIG. 6 is a block diagram featuring a pair of mobile devices.

Referring first to FIG. 6, shown is a block diagram featuring two mobile devices 70,80. For this example, it is assumed that the second mobile device 80 is tracking the location of the first mobile device 70 in order to determine whether the two mobile devices 70,80 are within vicinity of one another. The two mobile devices 70,80 are shown to be separated by distance D, which is assumed to be great enough so that the two mobile devices 70,80 are not considered to be within vicinity of one another. The two mobile devices 70,80 are considered to be within vicinity of one another if the distance between them is less than a predefined proximity distance.

Details of the two mobile devices 70,80 are not shown for simplicity. In a specific implementation, the first device 70 is configured in a similar manner as the mobile device 30 shown in FIG. 1, while the second mobile device 80 is configured in a similar manner as the communication device 30 shown in FIG. 1. The second mobile device 80 nonetheless has a location message reducer (not shown) configured to reduce the number of location information messages involved. Alternative configurations are possible and are within the scope of this disclosure.

Figure 7:
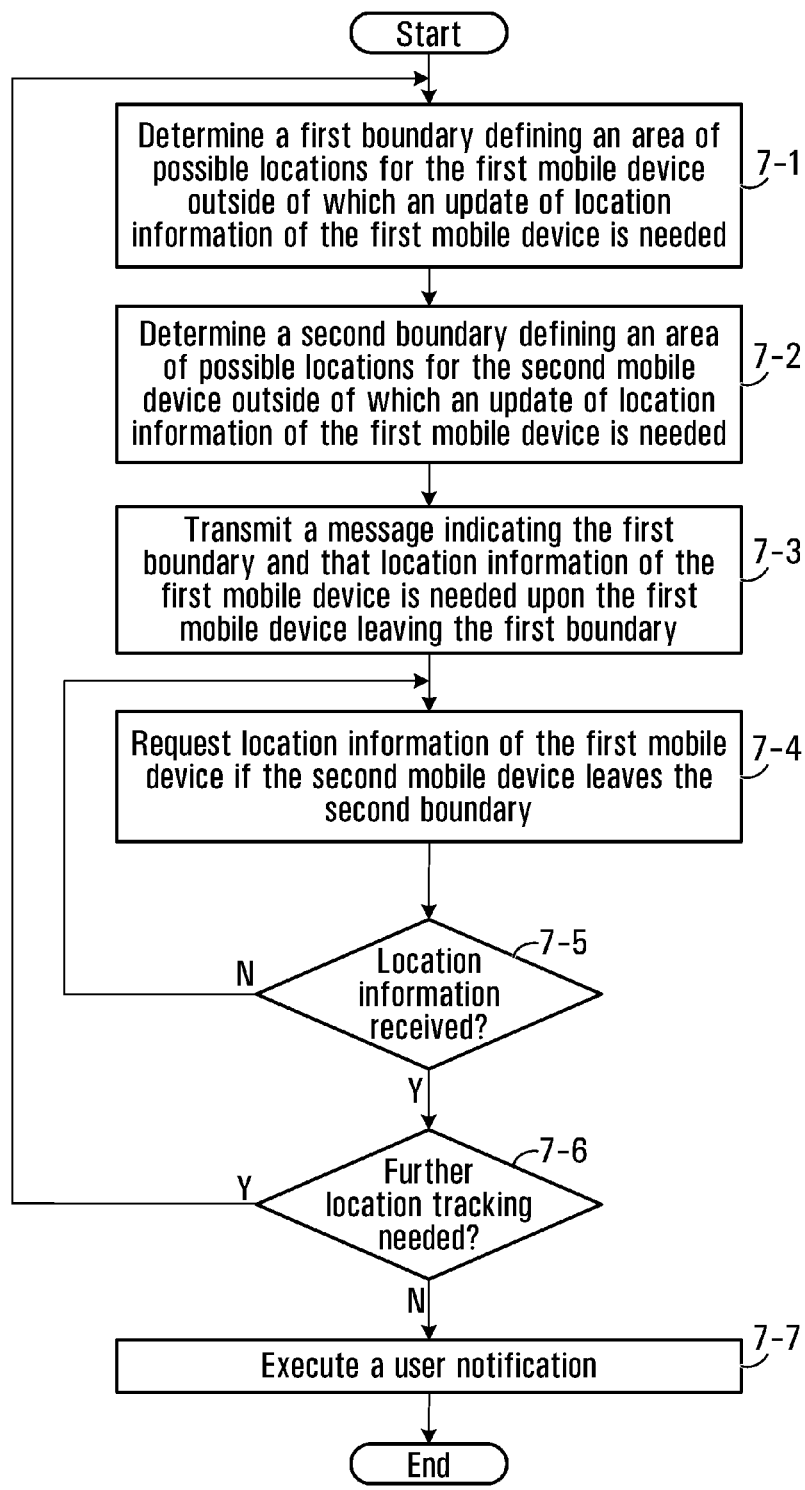
FIG. 7 is a flowchart of a method of reducing transmission of location information for proximity detection.

The operation of the second mobile device 80 performing the proximity detection will now be described by way of example with reference to FIG. 7, which is a flowchart of a method of reducing transmission of location information for proximity detection. For this example it is assumed that the two mobile devices 70,80 communicate in a peer-to-peer fashion. However, it is to be understood that they can alternatively communicate via a server as described earlier.

The method starts under the assumption that the second mobile device 80 has already calculated the distance D between the two mobile devices 70,80 and has determined that the distance D is greater than the predefined proximity distance. At step 7-1, the second mobile device 80 determines a first boundary 71 defining an area of possible locations for the first mobile device outside of which location information of the first mobile device 70 is needed. At step 7-2, the second mobile device 80 determines a second boundary 81 defining an area of possible locations for the second mobile device outside of which location information of the first mobile device 70 is needed. The boundaries 71,81 are determined such that the first mobile device 70 and the second mobile device 81 cannot be less than the predefined proximity distance from one another without at least one of the mobile devices 70,80 leaving its respective boundary 71,81. Therefore, as long as neither mobile device 70,80 leaves its respective boundary 71,81, there is no need for transmission of location information for proximity detection. This avoids excessive messaging.

In the illustrated example, each boundary 71,81 is a circle having a respective radius $R_1$, $R_2$. However, it is to be understood that any boundary is possible, provided that the first mobile device 70 and the second mobile device 81 cannot be less than the predefined proximity distance from one another without at least one of the mobile devices 70,80 leaving its respective boundary 71,81. Alternative boundaries include squares, other polygons, irregular shapes, infinite strips, etc.

At step 7-3, the second mobile device 80 transmits a message indicating the first boundary and that location information of the first mobile device 70 is needed upon the first device 70 leaving the first boundary. At step 7-4, the second mobile device 80 requests location information of the first mobile device 70 if the second mobile device 80 leaves the second boundary 81. Therefore, at step 7-5 the second mobile device 80 receives location information of the first mobile device 70 if the first mobile device 70 leaves the first boundary 71 or if the second mobile device 80 leaves the second boundary 81. This allows the second mobile device 80 to determine whether the two mobile devices 70,80 are in vicinity of one another if either of the two mobile devices 70,80 leaves its respective boundary 71,81.

If at step 7-5 the second mobile device 80 receives location information of the first mobile device 70, then at step 7-6 the second mobile device 80 determines whether further location tracking is needed. In particular, if the second mobile device 80 determines that the two mobile devices 70,80 are in vicinity of one another, then no further location tracking is performed and instead at step 7-7 the second mobile device 80 executes a user notification to inform the user that the two mobile devices 70,80 are in vicinity of one another.

However, if the second mobile device 80 determines that the two mobile devices 70,80 are not in vicinity of one another, then further location tracking is performed. In particular, the method goes back to the start in which the boundaries 71,81 are re-determined based on the new locations of the two mobile devices 70,80.

There are many ways to determine the size of the boundaries 71,81. In some implementations, they are determined to be large enough to reduce excessive messaging, but small enough to ensure that the two mobile devices do not quickly become in vicinity of one another before being detected by the second mobile device 80. In some implementations, the radius $R_1$ of the first boundary 71 is slightly less than half the distance D between the two mobile devices 70,80, but is greater than the predefined proximity distance. In some implementations, the radius $R_1$ of the first boundary 71 is computed by subtracting the predefined proximity distance plus some margin from the total distance D between the two mobile devices 70,80 and taking half of the remaining distance. In some implementations, the radius $R_2$ of the second boundary 81 is identical to the radius $R_1$ of the first boundary 71. However, note that there is no need for the boundaries 71,81 to be equal in size or shape.

In accordance with an embodiment of the disclosure, the boundaries are determined as a function of both location and speed. For instance, if the first mobile device 70 is moving faster than the second mobile device 80, then the first boundary 71 can be larger than the second boundary 81. This can reduce the number of times the boundaries are updated. If one user is not moving or is completely stationary, then the boundary around this user can be very small. In some implementations, the size of the boundaries can change as a function of speed each time the boundaries 71,81 are updated. Thus, changes in speed can result in change in boundary size.

In some implementations, each boundary 71,81 is a geofence, which is a virtual boundary on a geographic area. A geofence request can be sent to the first mobile device 70 for instructing the first mobile device 70 to provide its location information only if it leaves the first geofence 71. The geofence request can specify the geofence 71, for example by defining center and the radius $R_2$ of the second boundary 81. Other implementations are possible.

The illustrated method focuses on determining whether the two mobile devices 70,80 are in vicinity of one another. A similar method can be used for determining whether two mobile devices are no longer in vicinity of one another. For such method, the first boundary and the second boundary can be determined such that the first mobile device and the second mobile device cannot be more than the predefined proximity distance from one another without at least one of the mobile devices leaving its respective boundary. The second mobile device determines whether the two mobile devices are no longer in vicinity of one another when they are separated by at least the predefined proximity distance.

Geofencing is a limited case of proximity detection in which a communication device tracks movement of a mobile device, regardless of any movement of the communication device. Because any movement of the communication device is not considered, the communication device might be a wired device. The communication device determines a boundary that the mobile device must leave before location information of the mobile device is needed. The boundary is determined such that location information of the mobile device is not needed as long as the mobile device resides in the boundary. The communication device transmits a message indicating the boundary so that the mobile device will automatically provide location information only if it leaves the first boundary. Therefore, the communication device automatically receives location information of the mobile device only if the mobile device has left the boundary. This avoids excessive messaging.

In the illustrated example, it is assumed that the two mobile devices 70,80 communicate in a peer-to-peer fashion. However, it is to be understood that alternative arrangements are possible and are within the scope of the disclosure. In alternative implementations, the two mobile devices 70,80 communicate via a server (not shown). If a server-based architecture is used, then the server can do the proximity calculation, but the same principles apply. A method similar to the one described above with reference to FIG. 7 can be implemented for server-based implementations. If a server-based architecture is used, then from the perspective of the first mobile device 70, there would be no difference except that messages would be sent to/from a server. The second mobile device 80 would send its location to the server as a message requesting proximity detection. If a proximity threshold is reached, then a message would be sent from the server to the second mobile device 80. By contrast, in a peer-to-peer implementation, the notification would originate from the second mobile device 80. A specific server-based implementation is described below for exemplary purposes.

Once a server determines that proximity detection is to be performed (e.g. a request is received) between a first mobile device and a second mobile device, then the server determines respective boundaries for the mobile devices. The server transmits a message to the first mobile device indicating a first boundary and that an update of location information of the first mobile device is needed upon the first mobile device leaving the first boundary. The server also transmits a message to the second mobile device indicating a second boundary and that an update of location information of the second mobile device is needed upon the second mobile device leaving the second boundary. In accordance with an embodiment of the disclosure, the first and second boundaries are determined based on both location and speed of the mobile devices.

If the first mobile device leaves the first boundary, then the server receives location information of the first mobile device and requests location information of the second mobile device. Also, if the second mobile device leaves the second boundary, then the server receives location information of the second mobile device and requests location information of the first mobile device. Therefore, if either mobile device leaves its respective boundary, then the server will become updated with the respective locations of the mobile devices. This allows the server to determine proximity of the mobile devices. More generally, the server determines whether further location tracking is needed. If further location tracking is needed, then the server goes back to determining the first boundary and the second boundary for performing further location tracking. Otherwise, the server notifies at least one of the mobile devices. In some implementations, the notification includes a result of the determination. For instance, if the server determines that the mobile devices are within a predefined proximity distance from one another, then the notification can indicate this.

Aggregating Location Information

Figure 8:
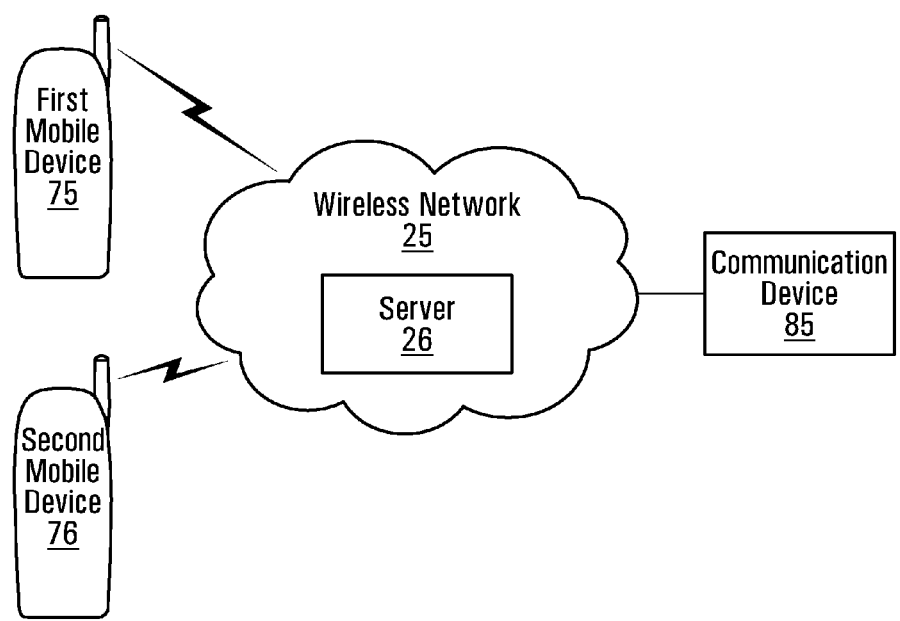
FIG. 8 is a block diagram of another example communication system.

Referring now to FIG. 8, shown is a block diagram of another example communication system. The communication system has a wireless network 25, and a plurality of devices 75,76,85 including at least two mobile devices 75,76 and a communication device 85. There might be other devices, but they are not shown for simplicity. Details of the devices 75,76,85 are not shown for simplicity. In a specific implementation, each mobile device 75,76 is configured in a similar manner as the mobile device 10 shown in FIG. 1, while the communication device 85 is configured in a similar manner as the communication device 10 shown in FIG. 1. Alternative configurations are possible and are within the scope of this disclosure.

Figure 9:
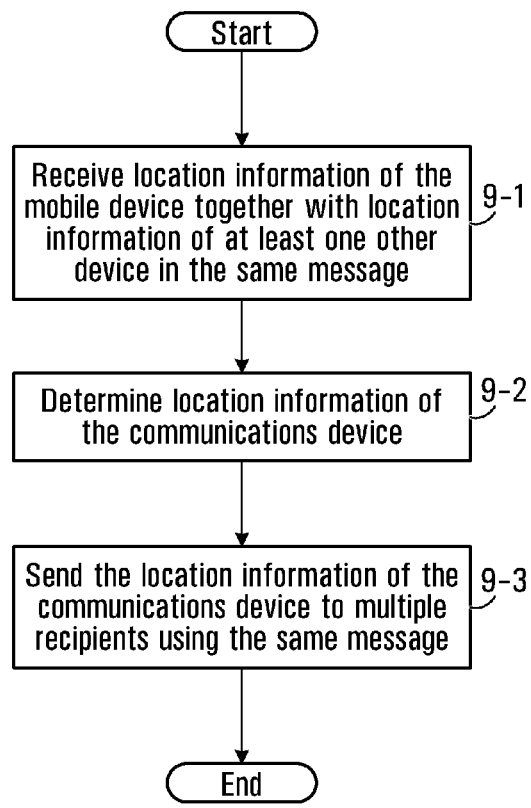
FIG. 9 is a flowchart of a method of reducing transmission of location information by aggregating location information.

The operation of the communication system will now be described by way of example with reference to FIG. 9, which is a flowchart of a method of reducing transmission of location information by aggregating location information. For this example it is assumed that the communication device 85 is tracking the location of each mobile device 75,76. Each mobile device 75,76 provides location information to the server 26, which in turn provides the location information to the communication device 85. In some implementations, the server 26 combines location information from each mobile device 75,76 into one message. Therefore, as indicated at step 9-1, the communication device 85 can receive location information for each mobile device 75,76 in the same message. This reduces the number of messages provided to the communication device 85.

In a specific example, if the communication device 85 is to receive location information from five other users (not shown) every 20 seconds, then instead of receiving five individual messages over a 20 second period, all the messages received within the 20 second period can be aggregated on the server 26 and sent as one message. The reception of location information from various devices can be aggregated on the server 26 and sent as one message/packet to the communication device 85 at an agreed upon "heartbeat" thereby reducing multiple asynchronous messages to a single message.

Conversely, if each mobile device 75,76 is tracking the location of the communication device 85, assuming that the communication device 85 is mobile, then after the communication device 85 determines location information at step 9-2 the communication device 85 can send the location information to all mobile devices 75,76 using the same message at step 9-3. In particular, the communication device 85 sends location information to the server 26, which in turn sends the location information to each mobile devices 75,76. Thus, only one message is sent by the communication device 85 for providing the location information to each mobile device 75,76.

In some implementations, the communication device 85 has rules and filters for location sharing stored on the server 26 so that the server 26 can determine if any location information is to be provided to devices such as the mobile devices 75,76 shown in the illustrated example. In some implementations, all location information is stored on the server 26 and external applications receive location updates from the server 26 instead of directly from the communication device 85. This can allow the location information to be sent once (to the server 26) and the server 26 can then send it along to all recipients.

In a specific example, if both a Twitter site and a Facebook site are to be updated with location information, then this can come from the server 26 instead of directly from the communication device 85. The communication device 85 sends location information to the server 26, which in turn sends the location information to Twitter and Facebook applications on other servers so as to update Twitter and Facebook accounts. Therefore, the communication device 85 sends location information once (to the server 26) as opposed to sending it twice (once to Twitter server, and once to Facebook server). Once the Twitter and Facebook accounts are updated, then any device using Twitter and/or Facebook can be updated with the location information using Twitter and/or Facebook protocols. In some implementations, twitter and/or facebook applications notify a device application of the change in location information. Other implementations are possible.

Another Mobile Device

Figure 10:
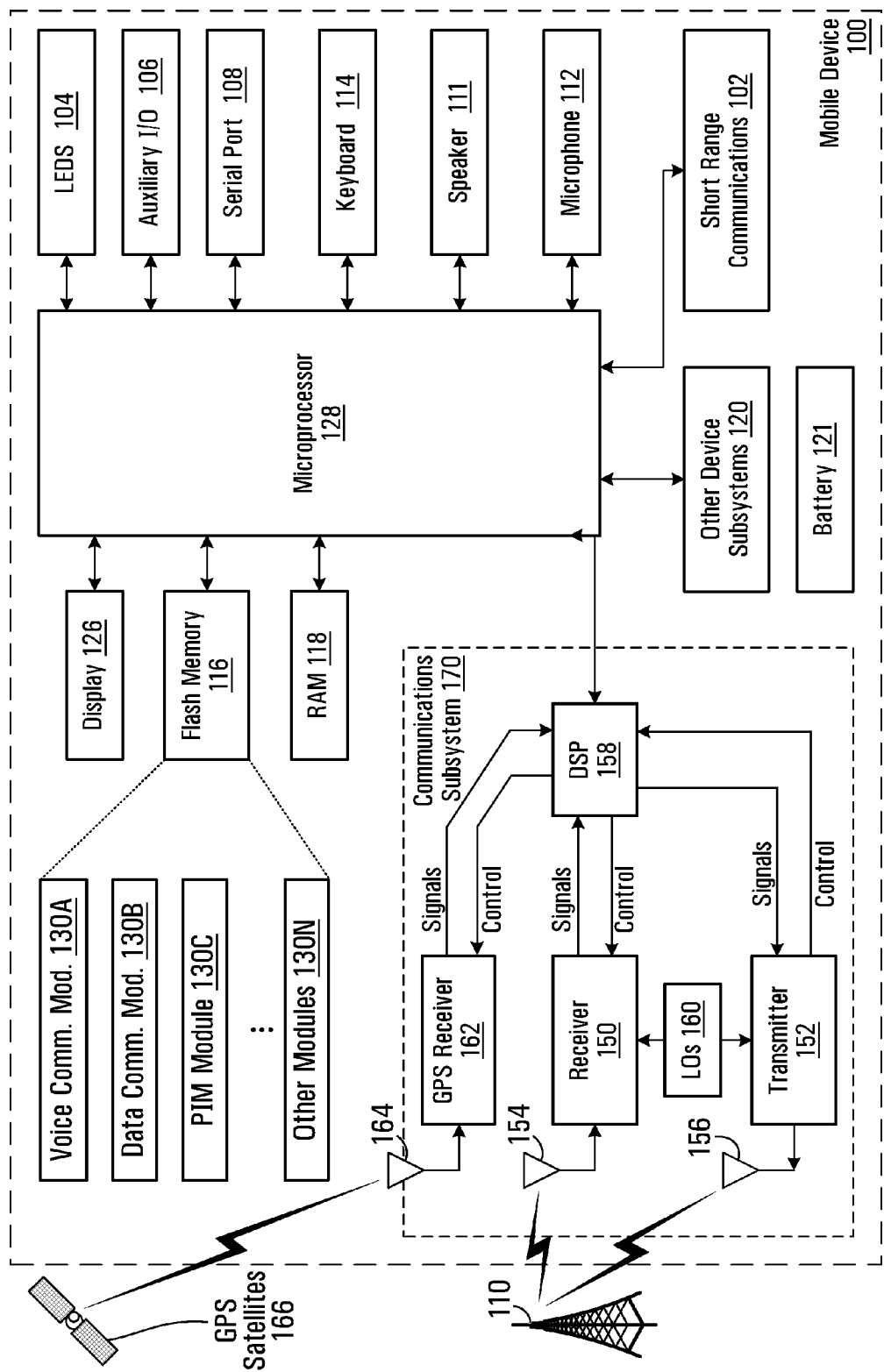
FIG. 10 is a block diagram of a mobile device.

Referring now to FIG. 10, shown is a block diagram of another mobile device 100 that may implement any of the device methods described herein. The mobile device 100 is shown with specific components for implementing features similar to those of the communication device 30 shown in FIG. 1. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 32 of the communication device 30 shown in FIG. 1. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the location message reducer 33 of the communication device 30 shown in FIG. 1. In a specific implementation, the other module 130N of the flash memory 116 stores computer executable instructions that when executed implement a location message reducer. Note that the implementations described with reference to FIG. 10 are very specific for exemplary purposes.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The communication subsystem 170 having the transmitter 152 and the receiver 150 is a specific implementation of the network interface 31 of the communication device 30 shown in FIG. 1. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

I claim:

1. A method for execution in a communication device, the method comprising:

displaying a graphic representation of a location of a mobile device on a screen of the communication device at a given resolution;

receiving location information of the mobile device on an ongoing basis;

determining whether location information of the mobile device is needed;

determining a specified distance corresponding to a pixel of the screen at the given resolution and if location information of the mobile device is not needed, transmitting a message to the mobile device indicating that location information of the mobile device is not needed;

if location information of the mobile device is needed, transmitting a message to the mobile device indicating the specified distance and that an update of location information of the mobile device is needed only if the mobile device travels the specified distance.

2. The method of claim 1, further comprising:

requesting to receive location information of the mobile device on an ongoing basis.

3. The method of claim 1, wherein determining whether location information of the mobile device is needed comprises:

determining whether an application that uses location information of the mobile device is tracking the mobile device.

4. The method of claim 1, further comprising:

at some time after transmitting the message indicating that location information of the mobile device is not needed:

determining whether location information of the mobile device is needed; and if location information of the mobile device is needed:

transmitting a message indicating that location information of the mobile device is needed; and receiving location information of the mobile device on an ongoing basis.

5. The method of claim 4, wherein determining whether location information of the mobile device is needed comprises:

determining whether an application that uses location information of the mobile device is tracking the mobile device.

6. The method of claim 1, further comprising:

displaying on a screen a graphic representation of a location of the mobile device on a map at a given resolution.

7. The method of claim 1, wherein the communication device is mobile, the method further comprising: receiving a message indicating a specified distance and that an update of location information of the mobile device is needed only if the mobile device travels the specified distance;

sending location information of the communication device on an ongoing basis;

receiving a message indicating that location information of the communication device is not needed; and in response to the message, ceasing to send location information of the communication device on the ongoing basis.

8. A computer readable medium having computer executable instructions stored thereon for execution on a processor of a communication device or a mobile device so as to implement the method of claim 1.

9. A method for execution in a mobile device, the method comprising:

sending location information of the mobile device on an ongoing basis by sending an update of location information of the mobile device whenever the mobile device travels a specified distance, wherein the specified distance is sent by a communication device and determined based on a current screen resolution of the communication device;

receiving a message indicating that location information of the mobile device is not needed; and in response to the message, ceasing to send location information of the mobile device on the ongoing basis.

10. The method of claim 9, further comprising:

upon ceasing to send location information of the mobile device on the ongoing basis, turning off a GPS receiver used for determining the location information of the mobile device.

11. A communication device comprising:

a network interface;

a processor;

a location message reducer configured for:

receiving location information of a mobile device on an ongoing basis;

determining whether location information of the mobile device is needed; if location information of the mobile device is not needed, transmitting a message indicating that location information of the mobile device is not needed;

if location information of the mobile device is needed, transmitting a message to the mobile device indicating a specified distance and that an update of location information of the mobile device is needed only if the mobile device travels the specified distance, wherein the specified distance is determined based on a current screen resolution; and a screen for displaying a graphic representation of a location of the mobile device on a map at a given resolution;

wherein the location message reducer is further configured for determining the specified distance as a distance that corresponds to a pixel of the screen at the given resolution; and wherein receiving location information of the mobile device on the ongoing basis comprises receiving an update of location information of the mobile device whenever the mobile device travels the specified distance.

12. The communication device of claim 11, wherein the communication device is a wired device.

13. The communication device of claim 11, wherein the communication device is mobile and the network interface is a wireless access radio.

14. The communication device of claim 11, further comprising:

an application that uses location information of the mobile device;

wherein determining whether location information of the mobile device is needed comprises:

determining whether the application is tracking the location of the mobile device.

15. A mobile device comprising:

a wireless access radio;

a processor; and a location data provider configured for:

sending location information of the mobile device on an ongoing basis, by sending an update of location information of the mobile device whenever the mobile device travels a specified distance wherein the specified distance is sent by a communication device and determined based on a current screen resolution of the communication device corresponding to a pixel of the screen of the communication device at the current screen resolution;

receiving a message indicating that location information of the mobile device is not needed; and in response to the message, ceasing to send location information of the mobile device on the ongoing basis.

16. The mobile device of claim 15, further comprising:

a GPS receiver used for determining location information of the mobile device;

wherein the location data provider is further configured for:

upon ceasing to send location information of the mobile device on the ongoing basis, turning off the GPS receiver.

* * * * *